US008661106B2

(12) United States Patent
Ungermann

(10) Patent No.: US 8,661,106 B2
(45) Date of Patent: Feb. 25, 2014

(54) METHOD OF CORRECTION OF NETWORK SYNCHRONISATION

(75) Inventor: Joern Ungermann, Aachen (DE)

(73) Assignee: NXP B.V., Eindhoven (NL)

( * ) Notice: Subject to any disclaimer, the term of this patent is extended or adjusted under 35 U.S.C. 154(b) by 168 days.

(21) Appl. No.: 12/867,450

(22) PCT Filed: Feb. 5, 2009

(86) PCT No.: PCT/IB2009/050461
§ 371 (c)(1),
(2), (4) Date: Aug. 12, 2010

(87) PCT Pub. No.: WO2009/101550
PCT Pub. Date: Aug. 20, 2009

(65) Prior Publication Data
US 2010/0318646 A1    Dec. 16, 2010

(30) Foreign Application Priority Data

Feb. 14, 2008 (EP) .................................. 08101626

(51) Int. Cl.
*G06F 15/173* (2006.01)
(52) U.S. Cl.
USPC ............ 709/223; 709/230; 709/248; 709/249
(58) Field of Classification Search
USPC .................... 709/223, 230, 248, 249
See application file for complete search history.

(56) References Cited

U.S. PATENT DOCUMENTS

| 6,975,877 | B1* | 12/2005 | Dergun et al. ............... 455/502 |
| 2005/0141565 | A1* | 6/2005 | Forest et al. ................. 370/503 |
| 2005/0195063 | A1 | 9/2005 | Mattsson |
| 2005/0237144 | A1 | 10/2005 | Einzinger et al. |
| 2006/0095591 | A1* | 5/2006 | Kelly ............................. 709/248 |
| 2006/0226943 | A1 | 10/2006 | Marques |
| 2009/0122782 | A1* | 5/2009 | Horn et al. .................... 370/350 |

FOREIGN PATENT DOCUMENTS

| CN | 101090531 A | 12/2007 |
| CN | 101111011 A | 1/2008 |
| EP | 1 280 024 A1 | 1/2003 |
| GB | 2 404 121 A | 1/2005 |
| WO | 2008/029322 A2 | 3/2008 |

OTHER PUBLICATIONS

Schneider, Fred B. "Understanding Protocols for Byzantine Clock Synchronization," 38 pgs. (Aug. 1987).
Kopetz, H., et al. "A Synchronization Strategy for a Time-Triggered Multicluster Real-Time System," IEEE Reliable Distributed Systems, pp. 154-161 (Sep. 13, 1995).

(Continued)

*Primary Examiner* — Lan-Dai T Truong

(57) ABSTRACT

The invention relates to a method of synchronizing the clock of different clusters including a first cluster (1) and a second cluster (2) which are connected by means of a connecting element (3) wherein the timing of the second cluster (2) is at least almost aligned to the timing of the first cluster (1), wherein the timing of the second cluster is determined by a node (4) of the second cluster which is connected to a reference node of the first cluster and wherein the node of the second cluster synchronizes itself with the reference node's timing and transfers an offset correction to the second cluster.

13 Claims, 3 Drawing Sheets

(56) References Cited

OTHER PUBLICATIONS

Pfeifer, H., et al ."Formal Verification for Time-Triggered Clock Synchronization," IEEE Dependable Computing for Critical Applications 7, pp. 207-226 (Jan. 6, 1999).

Echtle, Klaus, et al. "Fault—Tolerance of the FlexRay Clock Synchronization (Extended)" (Sep. 14, 2002).

"FlexRay Communications System Protocol Specification," ver. 2.1, rev. A, (Dec. 2005).

"FlexRay Communications System Preliminary Central Bus Guardian Specification," ver. 2.0.9, (Dec. 2005).

"FlexRay Communications System Electrical Physical Layer Specification," ver. 2.1, rev. B, 96 pgs. (Nov. 2006).

Ungermann, Jorn "Calculation of the FlexRay Clock Precision," Techn. Note. TN-2007-00904, Philips Research Aachen, 47 pgs. (Dec. 2007).

International Search Report and Written Opinion for Int'l. Patent Appln. No. PCT/IB2009/050461 (May 27, 2009).

* cited by examiner

METHOD OF CORRECTION OF NETWORK SYNCHRONISATION

FIELD OF THE INVENTION

The invention relates to a method of synchronising different clusters as claimed in claim 1.

BACKGROUND OF THE INVENTION

A typical fault-tolerant time-triggered network consists of typically one, two or more redundant channels, to which communications nodes are usually connected. Each of those nodes consists of or contains a communication controller, bus drivers, eventually a bus guardian device for each bus driver and an application host.

The bus driver transmits the bits and bytes that the communication controller provides onto its connected channel and in turn provides the communication controller with the information it receives on the channel. The communication controller is connected to both channels, delivers relevant data to the host application, and receives data from it that it in turn assembles to frames and delivers to the bus driver.

Those systems are at least partially time-triggered, that means that the time is sliced into recurring cycles, where each cycle consists of several time segments. Each node determines the start of a new cycle according to its own built-in clock. At least one segment is divided into a fixed number of time slots, where each time slot is assigned up to at most one communication controller, wherein that communication controller and alone that communication controller has the right to transmit. Other segments of the cycle can be used e.g. for dynamic arbitration schemes or other purposes.

The bus guardian is a device with an independent set of configuration data that enables the transmission on the bus only during those slots, which are specified by the configuration set.

The host application contains the data source and sink and is generally not concerned with the protocol activity. At least decisions that the communication controller cannot do alone are made by the host application.

The different nodes have to be synchronised to each other, since each node derives on its own the start of the cycle and thereby the placement of all time segments and time slots in time. To not be dependent on a single master clock whose failure would collapse the whole system, each node has an own clock. The difference between the own clock and the clocks of some subset of nodes of the system, which are called synchronisation-nodes, is used to correct its own clock in a fault-tolerant way.

Systems that match this correction are the TTP protocol or the FlexRay protocol. Each node of such a system behaves therefore relatively erratically with respect to its cycle length and the cycle start, since both figures are completely determined by the network traffic of the cluster. The distributed clock synchronisation algorithm makes sure that all nodes of the cluster stay synchronised within a calculable precision, but each single node may be subject to sizeable time shifts.

This becomes problematic, if another cluster or another mechanism shall be synchronised to that cluster. Such a second cluster may find it problematic to follow the jumps and shifts of a single node of the primary cluster. However, to stay in synchronisation with the primary cluster it seems necessary to do so. The FlexRay protocol specification describes this currently as the TT-D mode. It is currently in the process of defining a new operation mode called the TT-M mode. In this TT-M mode the clock synchronisation will not be distributed, but centrally controlled by a master node and eventually a backup node.

Having different modes it is difficult to perform the synchronisation of a TT-M cluster to a TT-D cluster. The TT-M cluster contains one master node and eventually a backup master that determines the timing of the TT-M cluster. However, the single means for communicating said timing is by transmission of frames which must be received by the slave nodes. For an immediate synchronisation to a node of the TT-D cluster, the TT-M master would need to send its synchronisation frame shifted by the amount of shift of the TT-D master node and the TT-M slaves would also need to be able to receive those. For large shifts this becomes problematic as the shifted frames might either collide with frames sent by the slaves according to the old timing or large guard intervals between frame transmissions would have to be defined, which are naturally detrimental to the useable bandwidth.

Also the alignment of two TT-D or TTP clusters is rather difficult. Generally one or several gateway nodes are responsible for that task. They have access to one node in each cluster, which are subject to said shifts. From that information only they have to cause the other cluster to perform rather large shifts following the movements of the node. In the general case, this causes an adverse oscillating behaviour.

This invention introduces a mechanism to smooth that effect and effectively reduce the amount of necessary correction.

OBJECT AND SUMMARY OF THE INVENTION

It is an object of the invention to create a method to synchronise the clock of different connected clusters.

The object of the invention will be solved by a method according to the features of claim 1. The inventive method of synchronising the clock of different clusters includes a first cluster and a second cluster which are connected by means of a connecting element wherein the timing of the second cluster is at least almost aligned to the timing of the first cluster, wherein the timing of the second cluster is determined by a node of the second cluster which is connected to a node of the first cluster and wherein the node synchronises itself on a reference node's timing and transfers this timing to the second cluster.

According to the invention a cluster could be defined preferably as a predetermined number or quantity of nodes, which are connected by means of at least one communication channel.

A node according to the invention might preferably be defined as an electronic control unit (ECU) which might include different components e.g. a micro controller, a host, a bus driver, a bus guardian, a transceiver and/or other components e.g. for the current or power supply.

According to the invention it is of advantage that the node of the first cluster is integrated within the first cluster and/or the node of the second cluster is integrated within the second cluster.

Furthermore it is of advantage that the first cluster is a master cluster. And it is of advantage that the second cluster is a slave cluster. Accordingly it is of advantage that the second cluster shall follow the timing determined by the first cluster.

According to another inventive idea it is of advantage that the first and the second cluster is a TT-D cluster. Furthermore it is of advantage that the first cluster is a FlexRay TT-D cluster and the second cluster is a FlexRay TT-E cluster.

Additionally it is helpful that the node retrieves an offset correction to be performed by the reference node.

Furthermore it is helpful that the offset correction is added to a current difference in timing between different cycle starts between the node and the reference node.

In case the clusters are TT-D clusters it is of advantage that both clusters align themselves to one another.

Furthermore it is of advantage that the node retrieves an offset correction to be performed by the reference node.

According to the invention it is of advantage that the offset correction is added to a current difference in timing between different cycle starts between the node and the reference node and/or wherein the offset correction term is bounded before being applied by node.

Additionally it is of advantage that node and both symmetrically calculate an offset correction term with respect to one another and half it.

Furthermore it is of advantage that the offset correction term is bounded before being applied by node and node.

BRIEF DESCRIPTION OF THE DRAWINGS

The above and other features and advantages of the invention will be apparent from the following description of an exemplary embodiment of the invention with reference to the accompanying drawings, in which.

DESCRIPTION OF EMBODIMENTS

Figure 1:
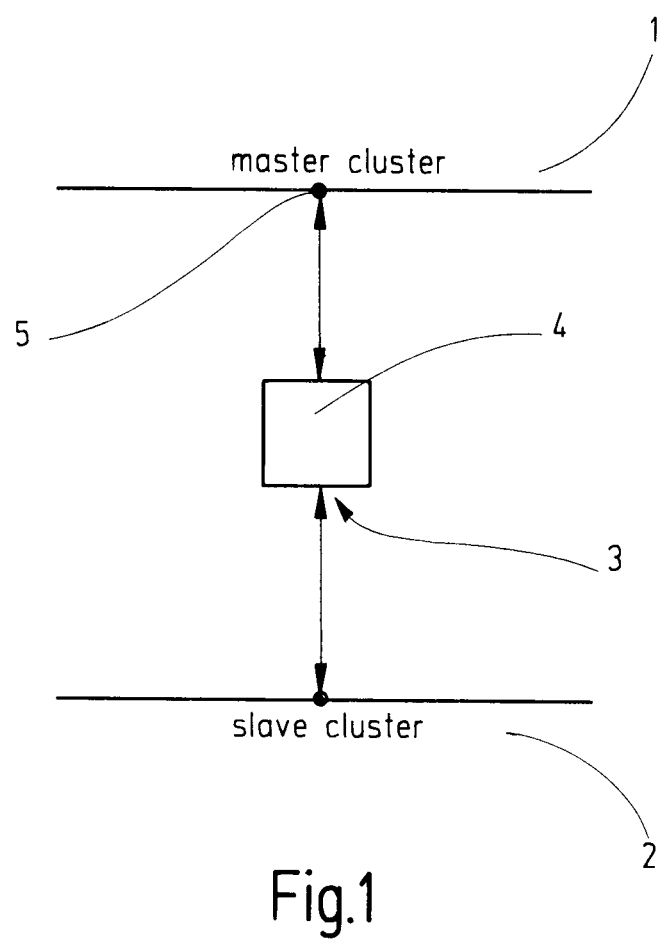
FIG. 1 shows a schematic view of a connection between two clusters.

FIG. 1 show schematically a master cluster 1 and a slave cluster 2 which are somehow connected by means of a connecting element 3. The following description shows how to synchronise a slave cluster 2 to a time-triggered master cluster 1. It is assumed that in both clusters 1, 2, the time-triggered master cluster 1 and the slave cluster 2, some kind of cycle exits, which shall have an at least almost identical length, and the starts of which shall also be at least almost synchronised with respect to one another.

It is assumed that the master cluster 1 uses a distributed or fault-tolerant clock synchronisation algorithm. The slave cluster 2 may be of any kind without limitations. However, the timing of the slave cluster 2 shall be closely aligned to that of the master cluster 1 and be determined by a special node of the slave cluster 2 connected to or integrated with a node of the master cluster 1. This node is called the master node but is not part of the master cluster. Therefore the connecting element 3 might be such a master node 4. The function of this master node 4 is then to align the slave cluster 2 to the master cluster 1. A common example for the slave cluster 2 would be a cluster of the same type as the master cluster 1 or a master-controlled cluster like the TT-M (time-triggered master) mode of FlexRay. The method of aligning the slave cluster 2 to the master cluster 1 is dependent from the cluster type. The master node 4 has access to the timing of one node of the master cluster 1, called the reference node 5. According to the invention the master node proceeds with a method as follows:

At first the master node 4 has to synchronise itself hard on the reference node's 5 timing and has to enforce this timing upon the slave cluster 2. This is generally easily achievable and mostly only possible at that time during the start-up phase of the slave cluster 2.

Secondly, at the end of each cycle, the master node 4 retrieves the offset correction to be performed by the reference node 5. It adds this correction term to the current difference in timing between different cycle starts between itself and the reference node 5. The resulting term is the total correction necessary to substantially or perfectly align the master node 4 to the reference node 5.

The above mentioned term "the end of each cycle" considers the point in time which occurs just before an application of a offset correction. For different protocols, this point in time might mean different point in time. For a FlexRay, e.g., this actually refers to the end of one double-cycle, i.e., the end of an odd numbered cycle. The above mentioned difference will start out with being 'zero' directly following the start-up, but will change from that as the reference nodes offset correction term is not applied fully.

Furthermore the master node 4 reduces the total correction term if its absolute value is larger than the correction limit to said limit or its negative value, in case that the correction term is negative.

After the last step the resulting bounded correction term is applied and the method will be continued with step 2.

In spite of the change of the correction term, the master node 4 will stay synchronised to the master cluster 1 within the same precision of the reference node. Thereby its clock difference to the reference node 5 is also bounded with the same limits. It therefore specifies the required minimum value for the correction limit.

A preferred implementation will provide a configuration register containing the correction limit, so it can be adjusted for the cluster at hand. A theoretical minimum for the offset correction limit is defined by the maximum drift between any two nodes caused by rate differences plus the error term influencing the measurements for offset correction, whereby with theoretical minimum it is meant that any limit as large or larger will assure that the master node stays synchronized to the reference node.

Figure 3:
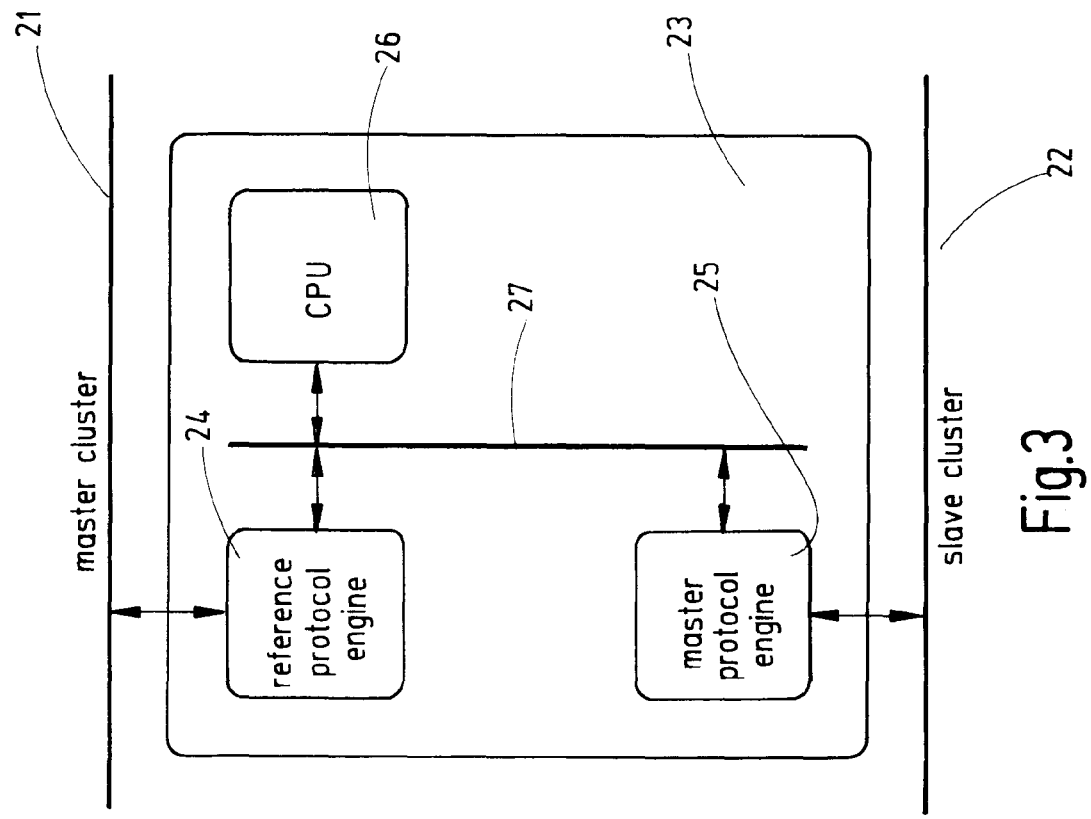
FIG. 3 shows a schematic diagram of a connection between a master cluster and a slave cluster.
Figure 2:
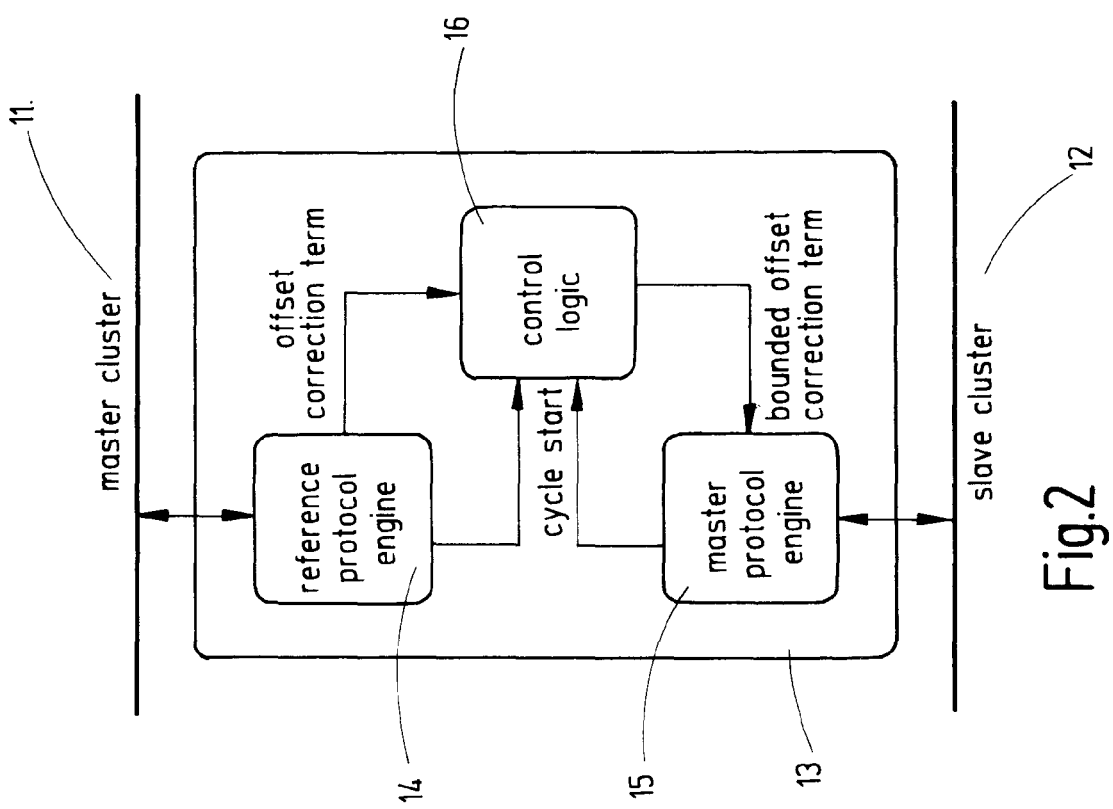
FIG. 2 shows a schematic diagram of a connection between a master cluster and a slave cluster.
Figure 4:
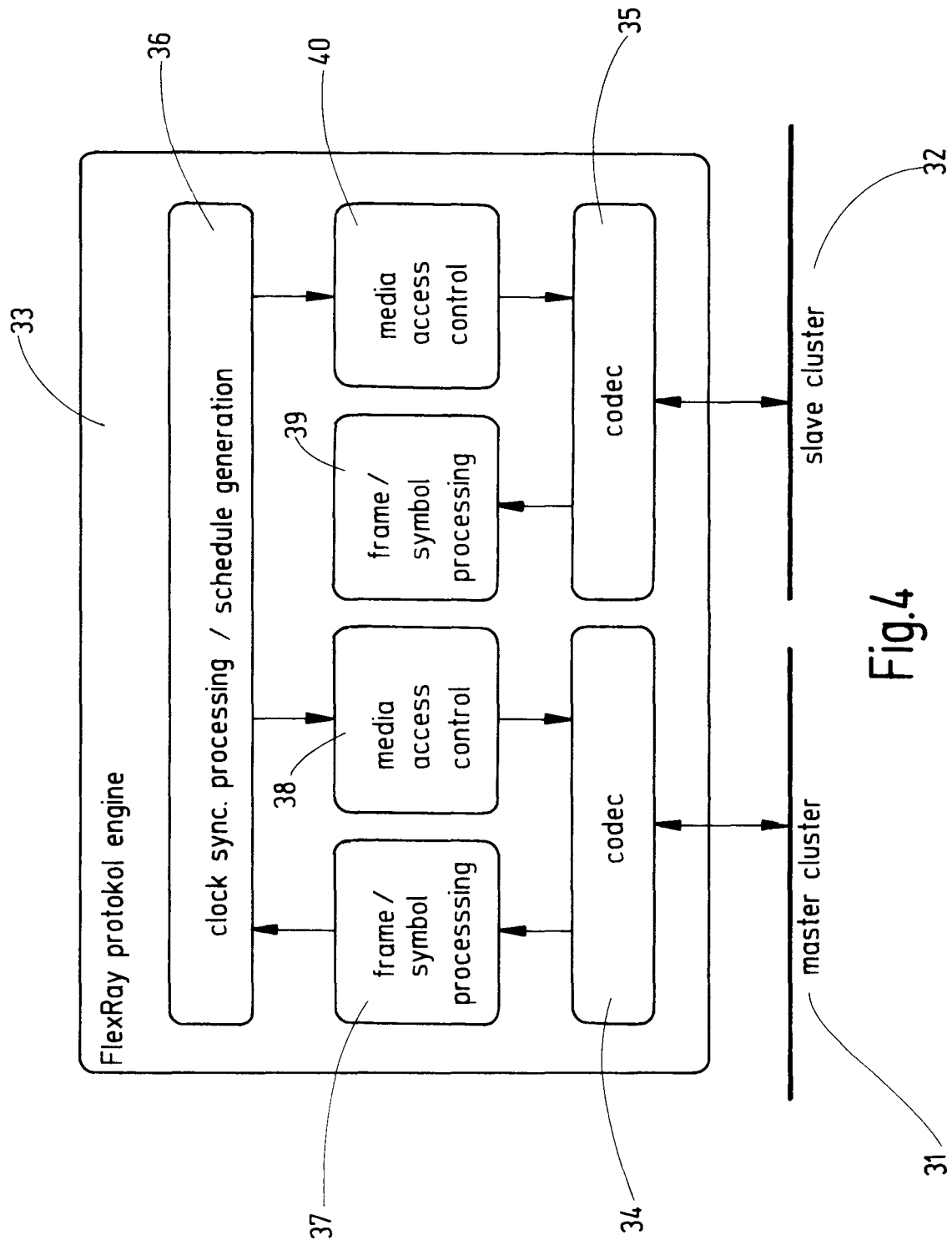
FIG. 4 shows a diagram of a FlexRay protocol engine between a master cluster and a slave cluster.

FIGS. 2 and 3 show different preferred implementations of the invention. The FIG. 2 shows a hardware supported solution, while FIG. 3 shows a software supported solution of the invention.

FIG. 2 shows a master cluster 11 and a slave cluster 12 while a communication element 13 serves as a communication device between both clusters. The communication device contains a reference protocol engine 14, a master protocol engine 15 and a control logic 16.

The control logic 16 receives from the reference protocol engine 14 a cycle start signal and an offset correction term while the master protocol engine receives the bounded offset correction term from the control logic 16.

The FIG. 3 shows a master cluster 21 and a slave cluster 22 while a communication element 23 serves as a communication device between both clusters. The communication device 23 contains a reference protocol engine 24, a master protocol engine 25 and a central processing unit (CPU) 26. The master protocol engine and the reference protocol engine are communicating with each other and with the CPU via a channel 27 or data bus.

The inventive method might be installed as hardware support which does not necessarily require a software intervention. Such an implementation might use a direct connection with modules responsible for an interaction with the master and the slave cluster in a kind of integrated micro-controller. It would retrieve information about the cycle start deviation between the master and the reference module, retrieve the offset correction term from the reference module and communicate the resulting term to the master module for application.

According to an other inventive idea this can also be implemented in a software function.

The inventive method might be used to synchronise two FlexRay TT-D clusters. In that case the master node has to distribute the bounded correction value over all nodes of the slave cluster to be used in the FlexRay external clock correction mechanism. The main effect for that application is that the amount of required external offset correction can be drastically reduced, so that less bandwidth has to be wasted to ensure the ability to properly apply said correction in the network idle time.

According to an other inventive idea it is furthermore possible two align two TT-D clusters, where no cluster is the master cluster, but both align themselves to one another. In that case both protocol engines in the gateway node perform the described algorithm, but both halve the total offset correction term before bounding it.

For this invention, only the communication controller is of importance for the invention. The bus driver, the bus guardian and the host devices as mentioned above are only listed to provide a better overview, in which context the invention might be used. The invention is not limited or restricted by the presence or absence of those devices.

Optionally, the host application might be informed about the current status by means of a signal, e.g. an interrupt signal, of the occurred bounding.

As a further optimisation it might be advantageous that it might contain a second addition configuration register containing the maximum bounded rate correct change. This value would bound the maximum change in the rate correction term from one double-cycle to the next and work similar to the bounding of the offset correction term. The rate correction value is not necessarily a one-shot correction term like the offset correction term. In this case the difference between the last rate correction term and the newly calculated one has to be determined. If the absolute value of this difference surpasses the maximum bounded rate correction term, this difference has to be increased/decreased similar to the increasing/decreasing of the offset correction term. The new difference has to be added to the old rate correction term to determine the final new rate correction term.

The above mentioned registers can be configured to contain values larger than the maximum possible correction values to ensure a completely FlexRay compliant behaviour, but also they might be used to produce the new, improved behaviour enabling a better worst-case precision of the slave cluster.

According to the invention it is furthermore of advantage to apply the bounding only during those cycles, where it actually sends frames, e.g. sync frames, to the slave cluster. This corresponds with the normal active state.

REFERENCES 1 first cluster, master cluster
2 second cluster, slave cluster
3 connecting element
4 node, master node
5 reference node
11 master cluster
12 slave cluster
13 communication element
14 reference protocol engine
15 master protocol engine
16 control logic
21 master cluster
22 slave cluster
23 communication element
24 reference protocol engine
25 master protocol engine
26 central processing unit (CPU)
27 channel
31 master cluster
32 slave cluster
33 protocol engine
34 codec
35 codec
36 block
37 block
38 block
39 block
40 block

The invention claimed is:

1. A method of synchronizing a clock of a plurality of different clusters including a first cluster and a second cluster which are connected by a connecting element, wherein a timing of the second cluster is substantially aligned to a timing of the first cluster, the method comprising:
determining the timing of the second cluster by a special node of the second cluster which is connected to a node of the first cluster;
synchronizing timing of the special node of the second cluster to timing of a reference node; and
transferring the synchronized timing from the special node to other nodes of the second cluster.

2. The method according to claim 1, wherein the special node of the second cluster is integrated with the node of the first cluster.

3. The method according to claim 1, wherein the second cluster follows the timing determined by the first cluster.

4. The method according to claim 1, wherein the first cluster and the second cluster are each a TT-D cluster.

5. The method according to claim 1, wherein the first cluster is a FlexRay TT-D cluster and the second cluster is a FlexRay TT-E cluster.

6. The method according to claim 1, further comprising:
retrieving, with the special node of the second cluster, an offset correction to be performed by the reference node.

7. The method according to claim 6, further comprising:
adding the offset correction to a current difference in timing between different cycle starts between the special node of the second cluster and the reference node.

8. The method according to claim 1, wherein the special node of the second cluster and the reference node both symmetrically calculate an offset correction term.

9. The method according to claim 7, further comprising:
bounding the offset correction term; and
applying the bounded term to both the special node of the second cluster and the reference node.

10. The method according to claim 1, wherein both the first and second clusters align themselves to one another.

11. The method of claim 1, wherein the special node of the second cluster is a connecting element.

12. The method of claim 9, wherein the step of bounding the offset correction term uses a correction limit stored in a configuration register.

13. The method of claim 12, further comprising:
defining the correction limit by a maximum drift between any two nodes.

* * * * *